July 1, 1924.

O. HAJEK 1,500,072

LUBRICATING DEVICE

Filed Sept. 13, 1923 2 Sheets-Sheet 1

Inventor
O. Hajek
By Marks & Clerk
Attys.

July 1, 1924.  O. HAJEK  1,500,072

LUBRICATING DEVICE

Filed Sept. 13, 1923   2 Sheets-Sheet 2

Inventor
O. Hajek
By Marks & Clerk
Attys.

Patented July 1, 1924.

1,500,072

UNITED STATES PATENT OFFICE.

OTTO HAJEK, OF VIENNA, AUSTRIA, ASSIGNOR TO THE FIRM ALEX. FRIEDMANN, OF VIENNA, AUSTRIA.

LUBRICATING DEVICE.

Application filed September 13, 1923. Serial No. 662,572.

*To all whom it may concern:*

Be it known that I, OTTO HAJEK, a citizen of the Republic of Austria, residing at Vienna, in the Republic of Austria, have invented certain new and useful Improvements in Lubricating Devices, of which the following is a specification.

This invention relates to lubricating devices of a kind already in practical use, comprising a plurality of lubricating pumps arranged to work in a common container, in which the piston itself controls the distribution and is for this purpose subjected to make a double movement viz a two and fro motion and an oscillating or rocking motion around its longitudinal axis.

Frequently a large number of places to be lubricated are to be supplied with oil with such a device and in this case each place is served by a separate pump. Now this invention has for its object to provide a lubricating device designed in a more simple, compact and effective manner than those hitherto known, wherein a single driving shaft for driving a plurality of pumps is provided, the said pumps being arranged in parallel rows within the oil container, thus allowing a more efficient utilization of the space available in the container.

According to the invention two or more parallel shafts are arranged connected with each other in such a manner that a combined reciprocating and oscillating movement imparted to one of said shafts will cause the other shafts to perform a like movement, whereby the pistons connected with said shafts are equally caused to perform a reciprocating movement and an oscillation around their longitudinal axes.

The invention is illustrated by way of example in the accompanying drawing in which—

Fig. 1 being a section along the line A—A in Fig. 2 and Fig. 2 a section along the line C—C in Fig. 1.

Like reference numerals refer to corresponding parts in all figures of the drawing.

Figure 1:
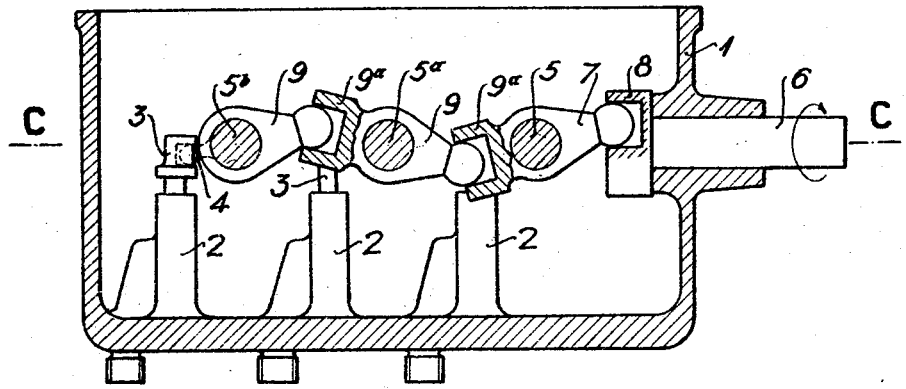
Figs. 1 and 2 show two sections taken along planes perpendicular to each other.
Figure 3:
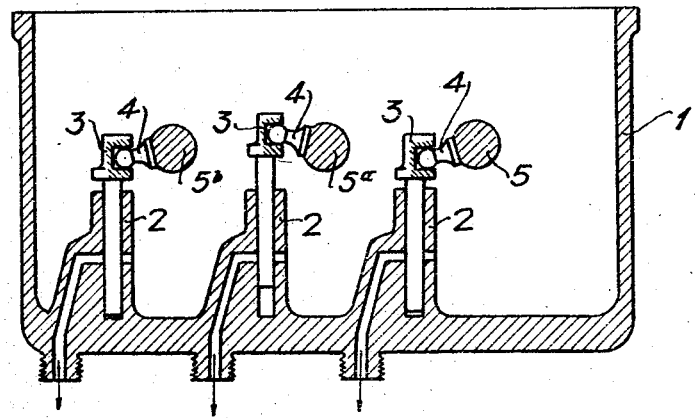
Fig. 3 shows a section along the line B—B in Fig. 2.
Figure 2:
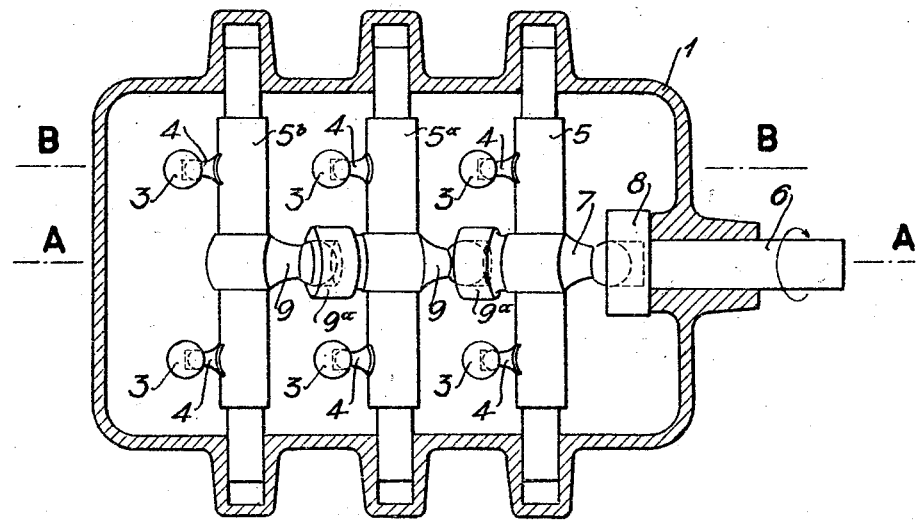
Figure 4:
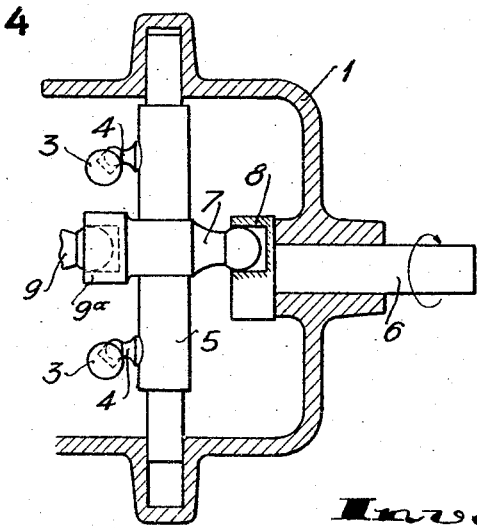
Fig. 4 shows the oscillating shaft driven by the driving shaft in another position, where the said shaft has been oscillated around an arc of 90° with respect to the position shown in Fig. 2.

In the oil container 1 the pumps 2 and a plurality of parallel shafts 5 are arranged, one of these shafts being reciprocated axially and oscillated around its axis by a driving shaft 6. This combined movement is transmitted by a crank arm 7 connected with a driving disk 8 by means of a ball joint in such a manner that the arm 7 performs a movement along a closed curve when the shaft 6 is rotated.

The pump pistons 3 connected with the shaft 5 by means of pivots or trunnions with ball shaped heads therefore equally perform a reciprocating axial and an oscillating movement around their longitudinal axes, thus controlling the inlet and outlet of the oil in the manner already well known. A number of further shafts $5^a$, $5^b$ arranged in parallel to said driven shaft 5 is in operative connection with the same, this connection being effected by crank arms provided on each of the shafts and jointed with the adjacent shaft. This connection is shown by way of example in the accompanying drawing and is performed by inserting the ball shaped end of the crank pin 9 of one shaft into a recess of a projection or process $9^a$ of the crank pin of an adjacent shaft. The jointed connection may, however, be effected also by other means, f. i., by a so called Hugh's key. When the driving shaft 6 is rotated, the shaft 5 performs a reciprocating and an oscillating movement around its axis and imparts a like movement to the shaft $5^a$, which in its turn reciprocates and oscillates the shaft $5^b$ and so forth. The axial displacement of two adjacent shafts are performed simultaneously and are of the same direction while the oscillating movements of these shafts are in opposition to each other.

What I claim is:

1. A lubricating device comprising a number of lubricating pumps arranged in parallel rows, pistons for circulating the oil controlling the oil distribution therein, a rotating driving shaft and a number of driven shafts arranged in parallel to each other, means to reciprocate and oscillate said driven shafts simultaneously and means to transmit the said reciprocating and oscillating movement of the shafts to the pistons in the lubricating pumps.

2. A lubricating device comprising a number of lubricating pumps arranged in an oil container in parallel rows, pistons for circulating the oil, controlling the oil distribution therein, a number of driven shafts arranged in parallel to each other, each shaft being connected with the adjacent shaft, a driving shaft performing a rotary movement, means to impart a combined reciprocating and oscillating movement from the rotating driving shaft to one of said driven shafts and means to transmit the combined movement of the first driven shaft to all the remaining driven shafts.

3. A lubricating device comprising a number of lubricating pumps arranged in parallel rows, pistons for circulating a lubricator, controlling the distribution of the lubricator therein, a driving shaft performing a rotary movement and a number of driven shafts adapted to perform a combined reciprocating and oscillating movement, the said driven shafts being arranged in parallel to each other, means to transmit said reciprocating and oscillating movement from the driven shafts to the pistons, means to impart a combined reciprocating and oscillating movement to one of said driven shafts and means to transmit said combined movement from one of the driven shafts to the remaining driven shafts.

4. In a lubricating device a number of lubricating pumps arranged in parallel rows, pistons adapted to control the oil distribution therein and also to circulate the oil, the said pistons being subjected to a combined reciprocating and oscillating movement, a number of shafts arranged in parallel to each other in proximity to said pistons, a connection between said shafts allowing to transmit a combined reciprocating and oscillating movement from each shaft to the adjacent shaft, means to transmit said combined movement from the said shafts to the pistons, a driving shaft performing a rotatory movement and means associated with one of the said shafts to convert the rotating movement of the driven shaft into a combined reciprocating and oscillating movement of the said driven shaft.

5. In a lubricating device, a number of lubricating pumps arranged in parallel rows, a piston adapted to perform a combined reciprocating and oscillating movement in each of said pumps, a rotating driving shaft and a number of driven shafts, arranged in parallel to each other, a connection between the driving shaft and one of the driven shafts, said connection comprising means to convert the rotating movement of the driving shaft into a combined reciprocating and oscillating movement, connections between each of the driven shafts with its adjacent shaft, said connection comprising means to transmit a combined reciprocating and oscillating movement from one shaft to the other and means to transmit the combined reciprocating and oscillating movement from each of the driven shafts to the pistons.

6. In a lubricating device a number of lubricating pumps arranged in parallel rows, pistons for circulating the oil and for controlling the oil distribution therein, the said pistons performing a combined reciprocating and oscillating movement, a driven shaft in proximity to each of said pistons capable of performing such a movement and means to transmit such movement from the shafts to the pistons, all driven shafts being arranged in parallel to each other, means to interconnect the said driven shafts, capable of transmitting the combined motion from one of the driven shafts to the adjacent one, a rotating driving shaft and means comprising a crank pin on one of said driven shafts to transmit a reciprocating and oscillating movement from the rotating shaft to one of said driven shafts.

7. In a lubricating device, a number of lubricating pumps arranged in parallel rows, pistons for circulating the oil and for controlling the oil distribution therein, the said pistons performing a combined reciprocating and oscillating movement, a driven shaft capable of performing such a combined movement in proximity to each of the pistons, all driven shafts being arranged in parallel to each other, a crank pin on each of said driven shafts connected with the adjacent shaft and capable of transmitting a combined reciprocating and oscillating movement from one shaft to the other, a driving shaft performing a rotary movement and means comprising a crank pin on one of said driven shafts for transmitting a combined reciprocating and oscillating movement from the driving shaft to the first of the driven shafts.

8. In a lubricating device, a number of lubricating pumps arranged in parallel rows, pistons for circulating the oil and controlling the oil distribution therein, the said pistons performing a reciprocating movement and an oscillating movement around their axis, driven shafts arranged in parallel to each other allotted to each of said pistons, each of said shafts being capable of performing such a combined movement, means to transmit said combined movement from each of the shafts to its allotted piston, a connection between the parallel shaft, consisting of a crank pin with a ball shaped head inserted into an open recess of the crank pin of its neighbour shaft, said connection being capable of transmitting the combined reciprocating and oscillating movement from one shaft to the other, a driving shaft provided with a driving disk performing a rotary movement in proximity to one of said driven shaft, and means comprising a crank arm connected with said driving disk for deriving a combined reciprocating and oscillating movement from said driving shaft and transmitting it to the driven shaft in proximity thereto.

In testimony whereof I have signed my name to this specification.

OTTO HAJEK.

Witnesses:
  CARL CONOTENBERG,
  YUSIF MERKLY.